United States Patent [19]
Niesen et al.

[11] 3,717,411
[45] Feb. 20, 1973

[54] REVERSIBLE COPYBOARD FOR ELECTROSTATIC COPYING MACHINE

[75] Inventors: George P. Niesen, Niles; Wolodymyr Dutko; William L. Garbarino, both of Chicago, all of Ill.

[73] Assignee: A. B. Dick Company, Niles, Ill.

[22] Filed: April 15, 1971

[21] Appl. No.: 134,362

[52] U.S. Cl. .................................. 355/75, 355/76
[51] Int. Cl. .................................................. G03b 27/62
[58] Field of Search .................................. 355/75, 93

[56] References Cited

UNITED STATES PATENTS

| | | | |
|---|---|---|---|
| 3,266,402 | 8/1966 | Benson | 355/93 X |
| 3,043,204 | 7/1962 | Benson | 355/93 X |
| 3,399,594 | 9/1968 | Leonhart | 355/75 X |
| 3,561,865 | 2/1971 | Burdick, Jr. | 355/75 X |

Primary Examiner—Samuel S. Matthews
Assistant Examiner—Russell E. Adams, Jr.
Attorney—McDougall, Hersh & Scott

[57] ABSTRACT

The housing of an electrostatic copying machine has an opening in the top thereof located over the means in the housing defining an exposure station. An open frame is disposed in such opening. A glass platen and a cover are each hingedly secured to this frame for individual swinging movement to and away from their normal positions wherein such members are coplanar with the frame. The frame is mounted for pivotal movement through 180° back and forth between a copying position wherein the cover may be swung away from the frame thereby permitting the material to be copied to be placed face down on the glass platen and a loading position wherein the glass platen may be swung away from the frame thereby permitting the material to be copied to be placed face up on the cover.

6 Claims, 23 Drawing Figures

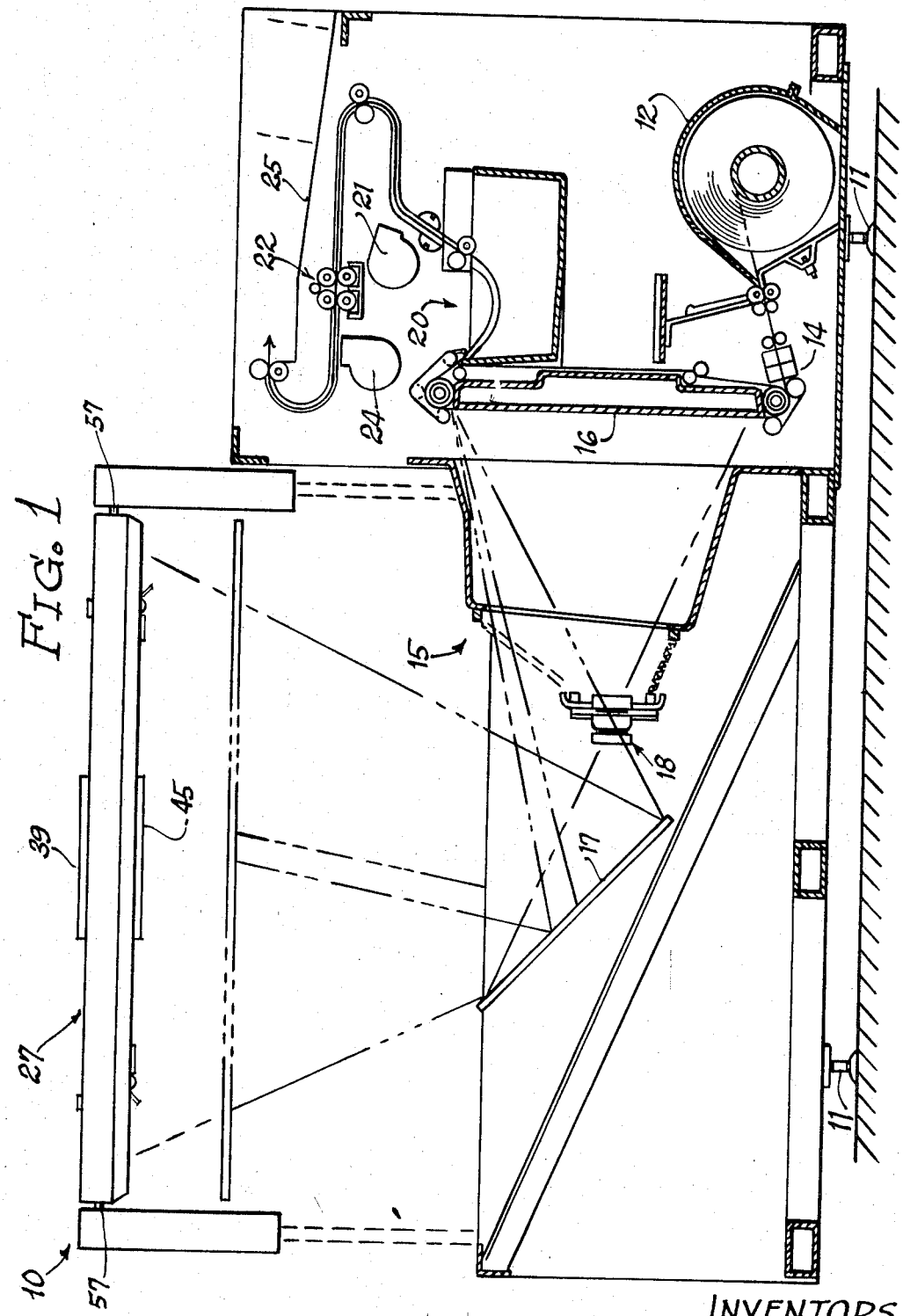

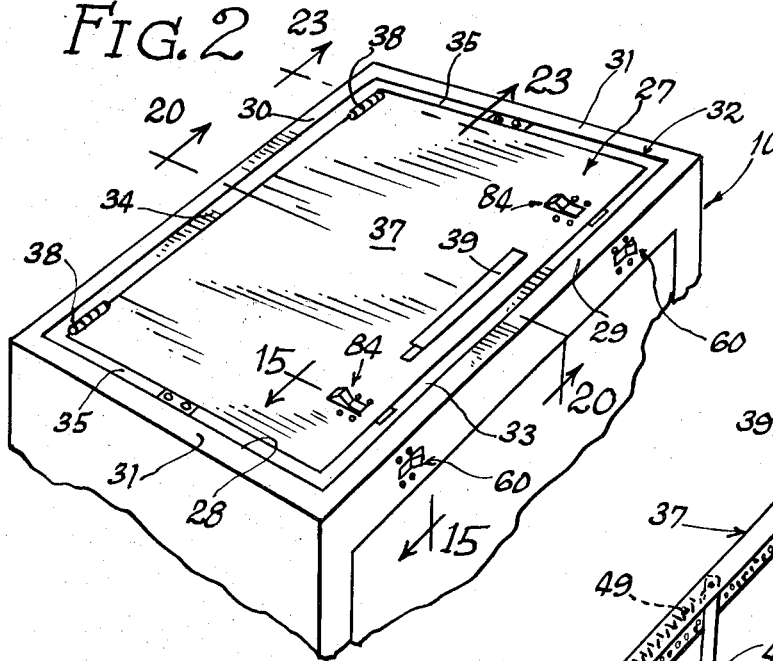

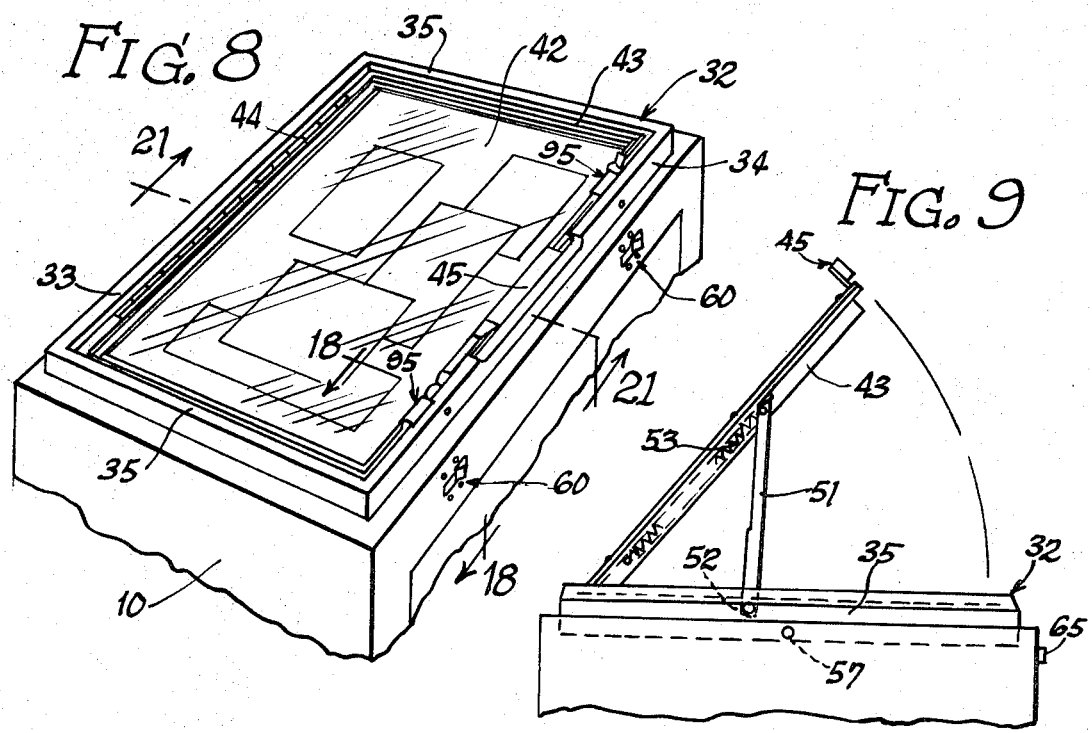
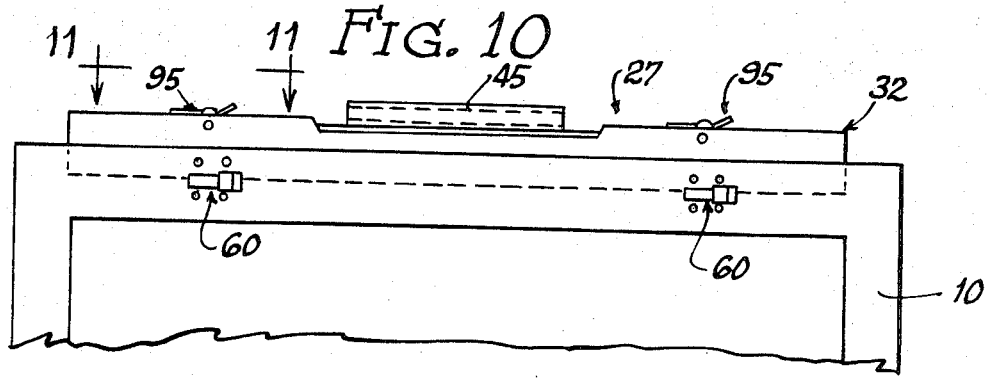
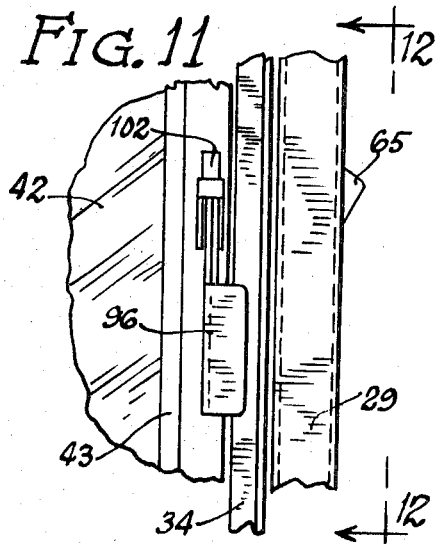
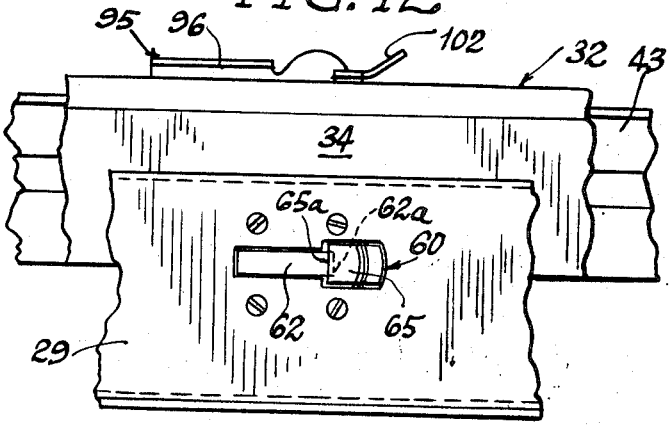

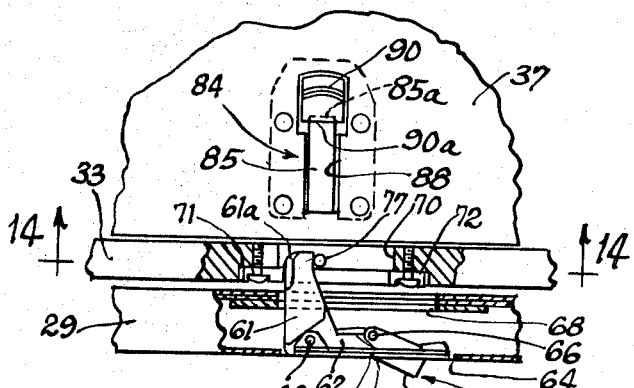
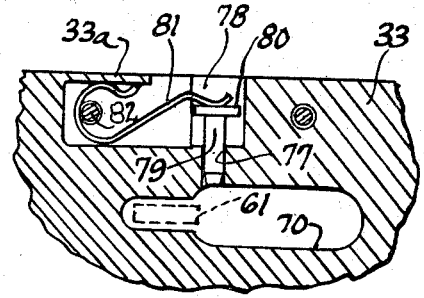
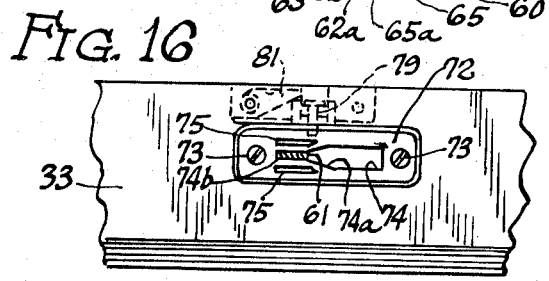
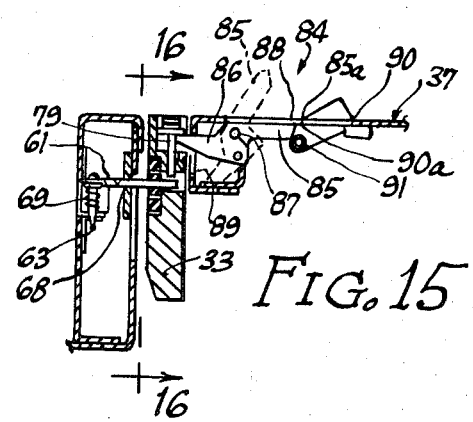
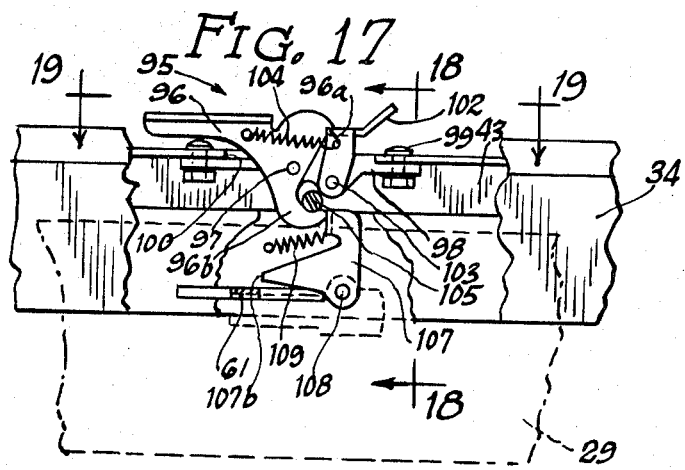
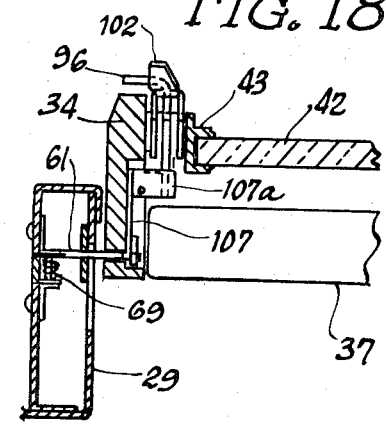
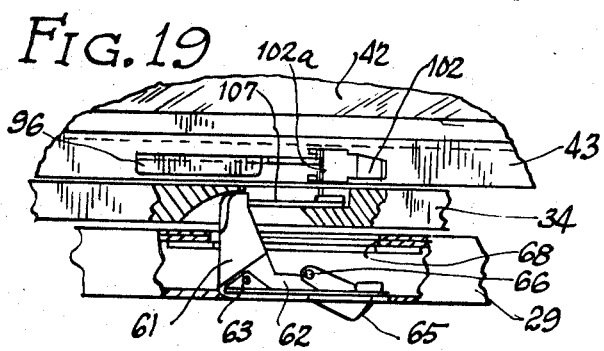

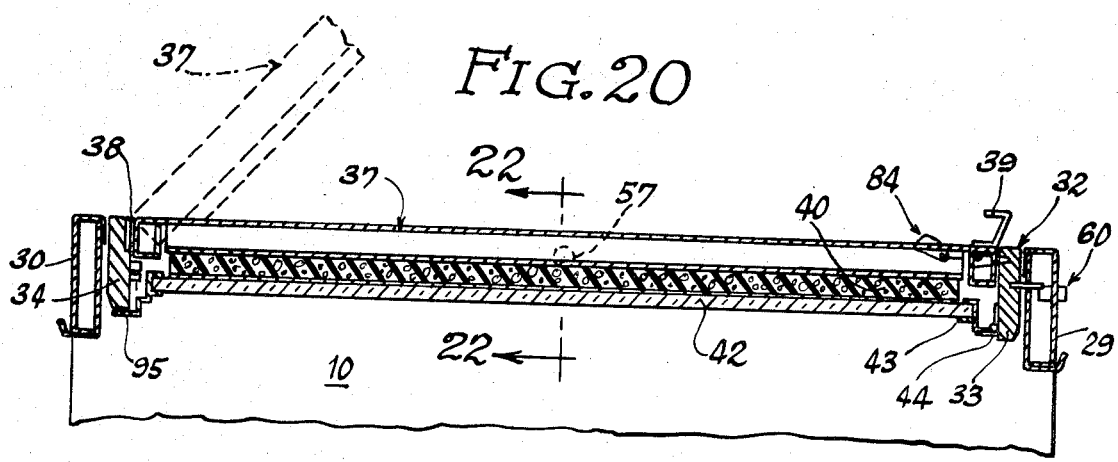
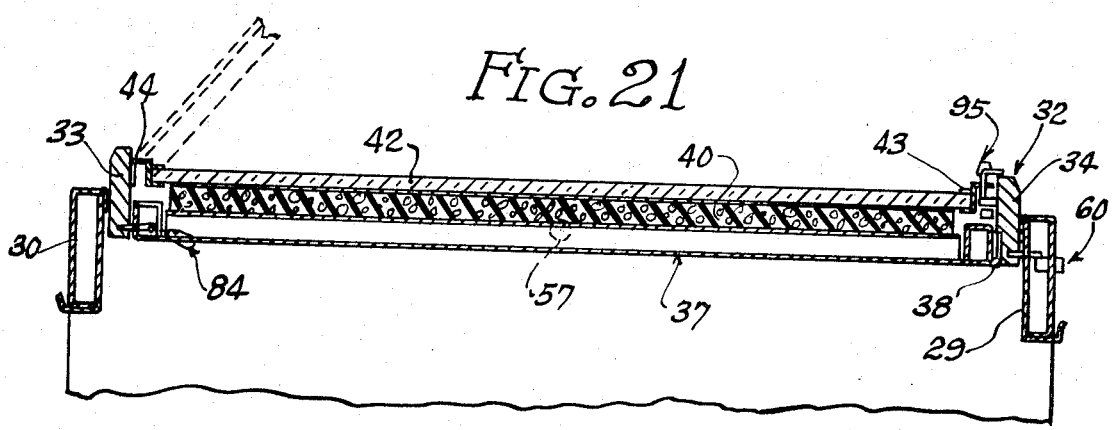
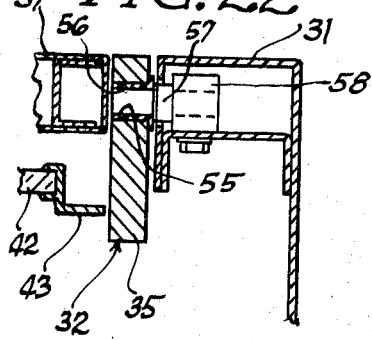
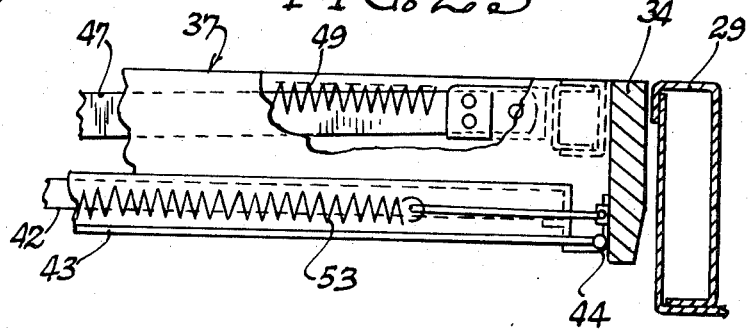

REVERSIBLE COPYBOARD FOR ELECTROSTATIC COPYING MACHINE

BACKGROUND OF THE INVENTION

1. Field of the Invention

The copied of the present invention relates to electrostatic copying machines. As is known to those skilled in the art pertaining to these machines, the original material to be copies is mounted such that an image of the original may be focused on charged electrostatic copy material thereby to form a latent electrostatic image of the original. The means for supporting the original in a machine of this type is referred to as a copyboard. More particularly, the present invention is directed to improvements in such a copyboard.

2. The Prior Art

One form of an electrostatic copying machine of the type under consideration includes a horizontally disposed platen which supports the original material to be copied in a face-up position. The means, including the focusing means, which define the exposure station of such machine, are mounted over this platen in vertical spaced relation thereto. During exposure, the platen is flooded with bright light, often momentarily blinding the operator. These machines sometimes result in overexposure of the film or copy paper to stray light.

In another form of prior art copying machine, the material to be copied is placed face down on a stationary glass platen disposed over the means which define the exposure station. This machine has a disadvantage stemming from the fact that the face or image side of the material to be copied, which is sometimes in two or more pieces, cannot be seen when so mounted or supported on the glass platen and therefore the operator may be unable to position the material properly for copying.

In still another form of prior art machine, such as shown in Leonhart U.S. Pat. No. 3,399,594, the copyboard includes a frame supporting a pad and a glass platen, the glass platen being hingedly secured to the frame. The material to be copied is placed face up on the pad and then held in place by closing of the glass platen. The frame is then rotated through 180° to place the copy material in an inverted or face-down position over the exposure means. This machine, although permitting the operator to see the face or image side of the copy material for proper mounting thereof, provides only the one mode of operation as just described and does not permit the rapid copying of successive pieces of material merely by placing the same face down on a glass platen.

SUMMARY AND OBJECTS OF THE INVENTION

The present invention may be summarized as relating to a new and improved copyboard for an electrostatic copying machine of the type described, which copyboard may be alternately disposed in copying and loading positions, the copying position permitting rapid face-down copying of the original material, and the loading position permitting face-up mounting and precise positioning of the material to be copied.

A primary object of the present invention is the provision of a new and improved reversible copyboard for an electrostatic copying machine.

Another object of the present invention is the provision of a new and improved copyboard of the type described, which copyboard includes an open frame, such frame hingedly supporting a glass platen and a cover, the frame being pivotally mounted such that in one position the cover may be swung away from the frame thereby to permit face-down placing of the original material on the glass platen and another position wherein the glass platen may be swung away from the frame thereby permitting the material to be copied to be positioned face up on the cover.

Still another object of the present invention is the provision of a new and improved copyboard of the type described wherein interlock means are provided to prevent pivotal movement of the frame away from its copying or loading position when either the cover or the glass platen is unlatched from the frame.

Yet another object of the present invention is the provision of a new and improved copyboard of the type described wherein latch means including wedge means are provided for locating the copyboard frame in the same predetermined plane each time it is swung to its copying position.

Another object of the present invention is to provide a new and improved copyboard of the type described wherein counterbalancing means are provided for releasably holding the cover and the glass platen in any of their positions relative to the frame.

These and other objects and advantages of the present invention will become apparent from the following specification disclosing a preferred embodiment shown in the accompanying drawings.

DESCRIPTION OF THE DRAWINGS

FIG. 1 is a vertical section, largely diagrammatic, of an electrostatic copying machine in which the present invention is embodied;

FIG. 2 is a fragmentary perspective of the machine showing the copyboard in its copying position;

FIG. 3 is an end view of the machine as seen from the left in FIG. 1 and showing the cover of the copyboard in the open position;

FIG. 4 is a fragmentary end view, largely diagrammatic in form, showing the manner in which the copyboard is pivotally mounted in the electrostatic copying machine;

FIG. 5 is an enlarged, fragmentary view taken along the line 5—5 of FIG. 3;

FIG. 6 is a view taken along the line 6—6 of FIG. 5;

FIG. 7 is an end view similar to FIG. 3 and showing the copyboard in its loading position;

FIG. 8 is a fragmentary perspective view of the machine showing the copyboard in its loading position;

FIG. 9 is an end view of the machine as seen from the left in FIG. 8 and showing the glass platen swung away from the copyboard frame;

FIG. 10 is a front elevation of the machine showing the copyboard in its loading position;

FIG. 11 is an enlarged view taken along the line 11—11 of FIG. 10, but shown rotated 90° from the direction of line 11—11;

FIG. 12 is a view taken along the line 12—12 of FIG. 11;

FIG. 13 is a fragmentary top plan view similar to FIG. 6 and showing certain parts broken away for better illustration of the invention;

FIG. 14 is a section taken along the line 14—14 of FIG. 13;

FIG. 15 is an enlarged section taken along the line 15—15 of FIG. 2;

FIG. 16 is a section taken along the line 16—16 of FIG. 15;

FIG. 17 is an enlarged, fragmentary view taken along the line 17—17 of FIG. 7;

FIG. 18 is a section taken along the lines 18—18 of FIGS. 8 and 17;

FIG. 19 is a view taken along the line 19—19 of FIG. 17 with certain parts being broken away for better illustration of the invention;

FIG. 20 is an enlarged section taken along the line 20—20 of FIG. 2;

FIG. 21 is an enlarged section taken along the line 21—21 of FIG. 8;

FIG. 22 is an enlarged, fragmentary section taken along the line 22—22 of FIG. 20; and FIG. 23 is an enlarged, fragmentary section taken along the line 23—23 of FIG. 2.

DESCRIPTION OF A PREFERRED EMBODIMENT

Referring to FIG. 1, and electrostatic copying machine in which the present invention is embodied includes a housing or frame 10 supported by a plurality of feet 11. The housing contains a rotatably mounted roll 12 of copy material having a coating of photoconductive material thereon, such as zinc oxide, for example. The copy material is advanced by suitable rollers to a corona or charging station 14 for subjecting the copy material to a potential between a corona discharge wire and a ground roller (not shown), all in a manner well known to those skilled in the art.

The copy material, having received a charge, is advanced by suitable rollers and belts to the exposure station, generally designated 15. As will be explained herein, an image of the original to be copied is focused on the copy material at the area designated 16 by means of a mirror 17 and a lens assembly 18, whereupon a latent electrostatic image of the original is formed on the copy material.

The copy material is then passed through a developer zone 20. In this zone, the copy material with the latent electrostatic image thereon is brought into contact with a developer fluid carrying particles of a suitable toner which adhere to the copy material over the charged areas thereof for forming a visible copy of the original.

After leaving the developer zone 20, the copy material is passed under a drying blower 21 for fixing the image on the copy material. Next, the copy material is passed through a conversion zone 22 for coating its image side with a suitable conversion solution to change the surface property of the copy material from hydrophobic to hydrophilic thereby making the copy capable for use as a master in an offset duplicating apparatus. After passing through the conversion zone, the copy material is advanced past another drying blower 24 and is then fed into a tray or receptacle 25 for removal from the copying machine.

It will be understood that the present invention is not to be limited for use with the particular electrostatic copying machine just described. This machine is merely representative of one of the many types of copying machines in which the present invention may be embodied.

The present invention is directed to a copyboard, generally designated 27, which is pivotally mounted in a rectangular opening 28 formed in the housing 10 of the electrostatic copying machine by means of fabricated side flange members 29, 30 and end flange members 31. The copy-board 27 includes a rectangular open frame, generally designated 32, including side members 33, 34, and similar end members 35. A rectangular opaque cover 37, substantially coextensive with the frame 32, is hingedly secured to the side frame member 34 by means of a pair of hinges 38. The cover is provided with a handle 39 to facilitate swinging of the cover away from the frame 32 about the axis defined by the hinges 38. When the cover is closed, it is contained in a plane parallel with the frame adjacent one face thereof. A rectangular pad 40, which is formed from a yieldable material, is affixed to the cover 37 and is substantially coextensive therewith.

A glass platen 42, substantially coextensive with the frame 32, is received within an open rectangular frame 43, the latter being hingedly secured to the side member 33 of the frame 32 by a hinge 44 preferably extending substantially the full length of the member 33. The frame 41 mounts a handle 45 to facilitate swinging of the glass platen 42 away from the frame 32 about an axis defined by the hinge 44. When the glass platen is closed, it is contained in a plane parallel with the frame adjacent the other face thereof.

Referring to FIGS. 3 and 23, a pair of arms 47 have respective ends mounted, as by means of pins 48, to the members 35 defining the ends of the frame 32. The other ends of these arms are slidably received within suitable guideways formed along opposite ends of the cover 37; these ends of the arms 47 are engaged by springs 49. The other ends of these springs are anchored to the cover 37 at the corners thereof adjacent the hinges 38. It should be apparent that the springs 49 act as counterbalancing means to provide for ease in opening and closing of the cover 37.

In like manner, another pair of arms 51 have respective ends pivotally mounted, as by means of pins 52, to the members 35 defining the ends of the frame 32. The other ends of these arms are slidably received in guideways formed along the ends of the frame 32 mounting the glass platen 42. These ends of the arms 51 are connected to the respective ends of a pair of springs 53; the other ends of these springs are suitably anchored to the glass platen frame 43 at the corners thereof adjacent opposite ends of the hinge 44. It will be apparent that the springs 53 provide a counterbalancing effect to ensure easy opening and closing of the glass platen frame 43 with respect to the frame 32.

The copyboard 27 is mounted for pivotal or swinging movement about its longitudinal centerline in the opening 28 formed in the housing 10 of the electrostatic copying machine. To this end, each end member 35 (FIG. 22) of the frame 32 includes a bore 55 receiving a cylindrical bearing 56 which in turn receives a pin 57, the latter being suitably mounted, as by means of a bracket 58, to the adjacent end flange 31. In the embodiment of the invention shown for purposes of illustration, the frame 32 may be rotated through 360° in either direction about the axis defined by the pins 57. However, it will be appreciated that it is only necessary for the frame 32 to be pivotable through 180° to present opposite faces of the copyboard 27 for access in the housing opening 28; to this end, the copyboard 27 may be considered as mounted for swinging or pivoting movement about the pins 57 back and forth between a copying position shown in FIG. 2 and a loading position shown in FIG. 8.

A pair of latch assemblies, each designated 60, is provided for alternately latching the copyboard in its two positions with the frame 32 contained in a horizontal plane. Since the latch assemblies 60 are of opposite hand, but otherwise identical construction, only one of said assemblies will be explained herein.

Each latch assembly 60 includes a latch member having a first arm 61 and a second arm 62, such member being pivotally mounted by a pin 63 suitably supported by ears formed on the flange member 29. The outer wall of this flange member is provided with a horizontally elongated opening 64 to permit swinging movement of the arm 62 therethrough as will be explained. The arm 62 includes a lip 62a which is engaged by a lip 65a formed on a latching actuator 65, the latter being mounted for pivoting movement in the opening 64 by a pin 66 which is suitably supported in the flange 29.

The arm 61 extends through a horizontally elongated opening 68 formed in the inner wall of the flange 29. A coil spring 69 suitably engages the latch member including the arms 61, 62 and the flange 29 for urging the former in a clockwise direction, as shown in FIG. 13, such movement normally being prevented by the interengagement of the lips 62a, 65a. When the actuator 65 is manually depressed by the operator against the force of another suitable spring (not shown), the lip 65a is disengaged from the lip 62a permitting the arms 61, 62 to be biased in a clockwise direction whereupon the arm 61 will be swung through the opening 68 and contained within the flange 29. The arms 61, 62 may be restored to their normal positions as shown in FIG. 13 by engaging the arm 62 and forcing the latter in a counterclockwise direction against the force of the spring 69, the actuator 65 being suitably manipulated to return the lips 62a, 65a into engagement for releasably holding the arms 61, 62 in the positions shown in FIG. 13.

The side member 33 of the frame 32 has an opening therethrough defined by a first opening 70 and a second opening 71. A wedge plate 72 is mounted in the opening 71, as by means of fasteners 73. This plate includes a horizontally extending slot 74 having inclined walls 74a defining a narrowed slot portion 74b at one end of the slot. The wedge plate 72 includes a pair of slots 75 adjacent the narrowed slot portion 74b to make the edges of the latter slightly compliant.

It will be understood that when the latch member including the arms 61, 62 is in its normal or latched position as shown in FIG. 13, the arm 61 is received in the narrowed portion 74b of the slot thereby to locate the frame 32 in a horizontal plane. The inclined walls 74a facilitate reception of the arm 61a in the narrowed slot 74b and tend to guide the former into the latter. The somewhat compliant nature of the edges defining the slots 74b tend to compensate for manufacturing tolerances so as to receive the arm 61 smoothly and without binding and at the same time to provide for rather precise positioning of the frame 32 in a horizontal plane. The arm 61 may be beveled, as at 61a, to facilitate further its smooth entrance into the slot portion 74b.

It will be apparent that when each latch 60 is in its normal or latched position as shown in FIG. 13, the arm 61 is received in the slot portion 74b for releasably securing the copyboard frame 32 in a horizontal position. When each latch is released upon depressing the actuator 65, the arm 62 is swung completely through the slot 74 thereby freeing the frame 32 for pivotal movement. It will be understood that the side member 34 of the frame includes openings and wedge plates identical to those provided in the side member 33 thereby to permit latching of the copyboard in its loading position as well as its copying position.

Referring to FIG. 14, it is observed that the member 33 of the copyboard frame 32 includes a bore 77 communicating at the lower end thereof with the opening 70 and communicating at the upper end thereof with a recess 78. A pin 79 is slidably received in the opening 77, which pin includes a head 80. A spring 81 has one end thereof engaging the top of the head 80 of the pin, the other end of this spring being engaged with ledge surface 33a of the frame member 33. The spring 81 is held in place by a pin 82; this spring constantly urges the pin 79 downwardly.

A pair of cover latch assemblies, each generally designated 84, is provided for releasably securing the cover 37 in its closed position, i.e., in a position wherein it is parallel with the frame 32. As these latch assemblies are of opposite hand, but otherwise identical construction, only one will be described herein.

Referring to FIGS. 13 and 15, each cover latch 84 is seen to include a latch member having a first arm 85 and a second arm 86, such member being suitably pivotally mounted on a pin 87 supported from the cover 37. The cover includes an opening 88 permitting swinging movement of the arm 85 back and forth between the solid and broken line positions shown in FIG. 15. The cover includes a flange wall having an opening 89 to receive the distal end of the arm 86. A suitable spring (not shown) urges the latch member including the arms 85, 86 to its solid line position, as shown in FIG. 15, with the arm 86 extending through the opening 89 and received under the head 80 of the pin 79.

The leg 85 includes a lip 85a which is engaged by a lip 90a on an actuator 90. The actuator 90 is mounted for pivotal movement about a pin 91, the latter being supported from the cover 37. A suitable spring (not shown) engages the actuator 90 for urging the same counterclockwise as shown in FIG. 15 for normally maintaining the lips 90a, 85a in engagement with each other.

When the cover 37 is to be opened, the actuator 90 is depressed thereby disengaging the lips 90a, 85a and permitting the arms 85, 86 to rotate to the broken line position shown in FIG. 15 whereupon the arm 86 will be disengaged from the head 80 of the pin 79 and withdrawn into the cover permitting the latter to be swung about the hinges 38. The disengagement of the latch arm 86 with the head 80 will allow the spring 81 to force the pin 77 downwardly whereupon the same will fall behind the latch arm 61 (FIG. 13), preventing actuation of the latch 60.

Accordingly, when the latches 84 are actuated to open the cover 37, it will not be possible to actuate the latches 60 for releasing the frame 32 for pivoting movement. In other words, each pin 79 defines an interlock between the latches 60 and 84 to prevent operation of the former when the latter are released to open the cover. When the cover 37 is returned to its closed position, each arm 85 is engaged by the operator and depressed to return the same to the solid line position shown in FIG. 15, the lip 85a again coming into engagement with the lip 90a for releasably securing the arm 85 in its latched or normal position. Such movement of the arm 86 will cause the pin 79 to be moved upwardly and out of engagement with the latch arm 61, thereby permitting actuation of the latch assemblies 60 to release the copyboard frame 32 for pivoting movement.

A pair of latch assemblies, each generally designated 95, is provided for releasably securing the glass platen 42 in its closed position, i.e., in a position parallel with the copyboard frame 32. Since the latch assemblies 35 are of opposite hand, but otherwise identical construction, only one will be described herein.

Referring to FIGS. 17 through 19, each latch assembly 95 will be seen to include a latch member 96 pivotally mounted on a pin 97. This pin is supported from a bracket 98, the latter being secured by fasteners 99 to the glass platen frame 43. Such frame includes an opening 100 for receiving the latch member 96 as well as an actuator 102 which is pivotally mounted on a pin 103; this pin is supported by the bracket 98. A coil spring 104 has its respective opposite ends received in apertures in the latch 96 and actuator 102 for urging these members together such that a lip 102a on the actuator is received under a lip 96a on the latch member.

The latch member 96 includes a hook portion 96b which normally engages a pin 105, the latter being mounted on the side member 34 of the frame 32. The distal end of the hook 96b is engaged by an ear 107a integral with an interlock member 107; this member is mounted for pivoting movement by a pin 108, which pin is suitably supported by the side frame member 34. The interlock 107 includes an interlock surface 107b. A spring 109 is engaged with the ear 107a and anchored to the side frame member 34 to urge the interlock member 107 in a counterclockwise direction as viewed in FIG. 17.

When it is desired to unlatch the glass platen 42, the actuator members 102 are depressed disengaging the lips 102a from the lips 96a and causing the latch members 96 to be pivoted for disengaging the hooks 96b from the pins 105, thereby permitting swinging of the glass platen 42 and frame member 43 about the axis defined by the hinge 44. The aforesaid movement of the hook portions 96b allows the interlock members 107 to rotate for lowering of the interlock surfaces 107b behind the latch arms 61a, as best seen in FIG. 19. Such movement of the interlock surfaces 107b will prevent actuation of the latch assemblies 60. Accordingly, when the glass platen latches 84 are actuated for opening the glass platen, the interlock means constituted by the members 107 come into play to prevent actuation of the latch assemblies 60 and thereby prevent unlatching of the copyboard frame 32.

When the glass platen 42 is returned to its closed position, the operator engages the latch members 96 for returning the same to the position shown in FIG. 17, whereupon the lips 102a of the actuators will snap under the lips 96a for holding the latch members 96 in their latched positions with the hook portions 96b receiving the pins 105. This return movement of the hook portions 96b will cause rocking of the interlock members 107 to raise the interlock surfaces 107b out of the path of movement of the latch arms 61. Therefore, upon latching of the glass platen frame 43 in place, it will then be possible to actuate the latch assembly 60 for unlatching of the copyboard frame 32 to permit pivotal movement thereof.

The operation of the present invention is as follows:

Assume it is desired to make a copy or copies of an original which is constituted by a single piece of sheet material. The copyboard 27 will be placed in the copying position shown in FIG. 7 and the latch assemblies 60 actuated to mount the frame 32 securely in place in a horizontal plane. The latches 84 are then actuated for releasing the cover whereupon the original may be placed face down on the glass platen 42; the counterbalancing springs 49 hold the cover in an open position to facilitate mounting of the original. The cover 37 is closed bringing the pad 40 into engagement with the back of the original material holding the latter securely in place on the glass platen. The latches 84 are preferably actuated for releasably securing the cover 37 in its closed position. After one or more copies of the original are made, the latch assemblies 84 are again actuated for releasing the cover thereby to permit removal of the original. Accordingly, it will be apparent that when the copyboard 27 is pivoted to or disposed in its copying position, originals may be readily and quickly mounted in face-down relationship on the glass platen 42 for copying.

Now assume it is desired to copy original material comprising two or more pieces as indicated in phantom lines in FIG. 8. First, the latches 60 must be actuated to release the frame 32 for pivoting movement. Of course, it will not be possible to actuate the latch assemblies 60 unless the cover 37 is latched in its closed position. Upon actuation of the latch assemblies 60, the copyboard 27 is rotated through 180° and the same latch assemblies actuated for again securing the copyboard frame 32 in a horizontal plane.

Actuation of the latch assemblies 95 for opening of the glass platen frame 43 will being the aforedescribed interlock means into play to prevent actuation of the latch assemblies 60. The glass platen frame 43 is opened as indicated in FIG. 9, the counterbalancing springs 53 serving to hold the glass platen in the open position. The various pieces of original material to be copied are placed face up on the pad 40 and arranged as desired. Preferably, scale means are provided to facilitate positioning of the pieces of original material. After the material to be copied is so arranged, the glass platen 42 is swung to its closed position and the latches 95 actuated for securing the glass platen frame 43 to the copyboard frame 32. Such action will now permit actuation of the latch assemblies 60 to release the copyboard whereupon the same is rotated to the copying position. The latch assemblies 60 are again actuated for securing the copyboard frame 32 in its horizontal plane.

After one or more copies are made, the latch assemblies 60 are actuated to release the copyboard frame for swinging movement to the loading position. The latch assemblies 60 are then actuated for securing the frame 32 in its horizontal plane. Finally, the latch assemblies 95 are actuated to open the glass platen frame 43 for removal of the pieces of original material.

Thus, it will be seen that the present invention provides a unique copyboard for an electrostatic copying machine which, in the copying position, permits the rapid mounting of original material in face-down relationship on the glass platen 42, and which, in the loading position, permits face-up mounting and arranging of plural pieces of original material prior to copying thereof.

The interlock means between the latch assemblies 60 for the copyboard frame 32 and the latch assemblies 84 and 95 for the cover and glass platen, respectively, provide a safety feature as they permit pivoting of the copyboard only after the cover and glass platen are securely latched in place. The wedging means operated by the latch assemblies 60 ensure that the material to be copied will be contained in a predetermined horizontal plane thereby to prevent distortion in the electrostatic copy. The copyboard 27 is evenly balanced with respect to its longitudinal centerline thereby permitting easy manual pivoting or swinging of the copyboard. Of course, powered means could be provided if desired to cause such pivoting movement. The counterbalancing springs associated with the cover and the glass platen frame provide for easy opening and closing of these members.

We claim:

1. In an electrostatic copying machine of the type having a housing including means defining an exposure station and having a first opening in the top of said housing over said means, the improvement comprising:
   a. a frame disposed in said opening, the former being generally planar and shaped complementarily with the latter said frame defining a second opening extending therethrough from one face of the frame to the other face thereof and having an area at least as large as the area of the material to be copied;
   b. a transparent platen substantially coextensive with said second opening and hingedly secured to the latter for swinging movement to and away from a normal position wherein it is parallel with the plane of said frame adjacent said one face thereof;
   c. a cover substantially coextensive with said platen and hingedly secured to said frame for swinging movement to and away from a normal position wherein it is parallel with the plane of said frame adjacent said other face thereof;
   d. mounting means supporting said frame in said opening for pivoting movement through 180° back and forth between:
      1. a copying position wherein said frame is horizontally disposed with said cover being over said platen thereby permitting copying of material by swinging the cover away from the platen and placing the material face down on the latter; and
      2. a loading position wherein said frame is horizontally disposed with said platen being over said cover thereby permitting mounting of material to be copied by swinging the platen away from the cover and placing the material face up on the latter.

2. The improvement according to claim 1 further defined by latch means engaging said housing and said frame for alternately releasably securing the latter in its copying and loading positions.

3. The improvement according to claim 1 further defined by:
   a. counterbalancing means connected with said frame and said cover for releasably holding the latter in any of its positions relative to the former; and
   b. other counterbalancing means connected with said frame and said platen for releasably holding the latter in any of its positions relative to the former.

4. The improvement according to claim 1 further defined by:
   a. first latch means engaged with said housing and said frame for alternately, releasably securing the latter in said copying and loading positions, release of said first latch means permitting said pivotal movement of the frame;
   b. second latch means engaging said frame and said platen for releasably securing the latter in its parallel position with the former;
   c. third latch means engaging said frame and said cover for releasably securing the latter in its parallel position with the former;
   d. first interlock means engaged with said first and second latch means for preventing release of the former upon release of the latter to swing said platen away from said frame; and
   e. second interlock means engaged with said first and third latch means for preventing release of the former upon release of the latter to swing said cover away from said frame.

5. The improvement according to claim 1 further defined by, said frame being rectangular and defined by side members and end members, said mounting means supporting the frame for pivotal movement about the centerline of the frame which is parallel with said side members, said platen being hinged to said frame adjacent one side member thereof and said cover being hinged to said frame adjacent the other side member thereof.

6. The improvement according to claim 1 further defined by, latch means engaged with said housing and said frame for alternately, releasably securing the latter in said copying and loading positions upon actuation of the latch means, release of said latch means permitting said pivoting movement of said frame, said latch means including wedge means operated in response to actuation of the former for locating the frame in the same predetermined plane each time it is pivoted to its copying position.

* * * * *